United States Patent [19]

Asai et al.

[11] Patent Number: 5,141,985
[45] Date of Patent: Aug. 25, 1992

[54] WHOLLY AROMATIC POLYESTER RESIN COMPOSITION AND OVENWARE OBTAINED BY MOLDING SAID COMPOSITION

[75] Inventors: Kuniaki Asai, Tondabayashi; Tadayasu Kobayashi, Tsukuba, both of Japan

[73] Assignee: Sumitomo Chemical Company, Limited, Osaka, Japan

[21] Appl. No.: 667,746

[22] Filed: Mar. 11, 1991

[30] Foreign Application Priority Data

Mar. 14, 1990 [JP] Japan .................................. 2-64726

[51] Int. Cl.⁵ .......................... C08J 3/20; C08K 3/22; C08L 31/06
[52] U.S. Cl. .................................... 524/497; 524/444; 524/494
[58] Field of Search ..................... 524/494, 497, 444

[56] References Cited

U.S. PATENT DOCUMENTS 4,585,823  4/1986  Saito et al. ........................ 524/600
4,741,955  5/1988  Saito et al. ........................ 428/422
4,970,256 11/1990  Inoue et al. ....................... 524/443

FOREIGN PATENT DOCUMENTS 60063255 11/1983 Japan .
60-124649 2/1985 Japan .
1-165667 6/1989 Japan .

Primary Examiner—Paul R. Michl
Assistant Examiner—U. K. Rajguru
Attorney, Agent, or Firm—Stevens, Davis, Miller & Mosher

[57] ABSTRACT

The wholly aromatic polyester resin composition of the present invention comprises a wholly aromatic polyester resin, at least one fibrous reinforcing agent, glass beads and titanium oxide.

The composition of the present invention has high heat resistance and mechanical strengths, low anisotropy and excellent appearance, being safe and shows a low dissolution amount in an extraction test according to No. 20 of the Welfare Ministry. Accordingly, the vessel obtained by molding the composition is suitable for use as an ovenware.

3 Claims, No Drawings

WHOLLY AROMATIC POLYESTER RESIN COMPOSITION AND OVENWARE OBTAINED BY MOLDING SAID COMPOSITION

The present invention relates to a wholly aromatic polyester resin composition having a high heat resistance and mechanical strength, low anisotropy [anisotropy refers to the difference in properties of melt between machine direction and transverse direction] and excellent appearance and being safe, that is, showing a low dissolution amount in an extraction test according to No. 20 of the Welfare Ministry, as well as to an ovenware obtained by molding said composition.

Certain plastic materials, for example, polymethylpentene and polysulfone are in use as a cooking vessel for microwave oven.

Ovenwares, i.e. cooking vessels for microwave oven with electric range, capable of effecting microwave irradiation and electric heating, are required to be excellent in various properties such as heat resistance, electrical properties, chemical resistance, appearance and the like. They are required to show a very high performance particularly in heat resistance because they not only undergo heat generation by microwave irradiation but also are exposed to the heat generated by electric range. For example, they are required to show no deformation and retain practical mechanical properties even at 200°–250° C.

Wholly aromatic polyester resins have various excellent properties due to the molecular structure and outperform all other resins in heat resistance in particular. Of the wholly aromatic polyester resins, those produced from (a) terephthalic acid or isophthalic acid, (b) parahydroxybenzoic acid or its derivative and (c) 4,4'-dihydroxydiphenyl or its derivative are injection-moldable and excellent in various properties such as heat resistance, chemical resistance, oil resistance, radiation resistance, insulation and the like, and accordingly find wide applications in electric, electronic and other fields. Examples of the applications are motor parts (commutator, brush holder), hair drier grill, lamp holder, relay parts, printed circuit board, connector, bobbin, IC device parts (IC socket, sleeve, wafer basket, etc.), thermistor case, heat sealer parts and jig for canning. Further, they have a high crystallinity and a very high heat distortion temperature of 250° C. or more although they have a high dielectric loss tangent (0.004–0.02 similarly to conventional polyester resins). Accordingly, even when irradiated with a microwave, they remain at temperatures lower than the heat distortion temperature and do not undergo easy deformation. Therefore, they have a heat resistance suitable for use as an ovenware.

However, said aromatic polyester resins show liquid crystal property in a molten state and, when they are injection-molded, the molded articles are significantly oriented to the machine direction (hereinafter referred to as MD) of the melt. Therefore, the molded articles have a large difference in mold shrinkage between MD and a direction transversing the MD (hereinafter referred to as TD) [(mold shrinkage in TD)/(mold shrinkage in MD) is larger than 10]. Accordingly, they have large mechanical strengths in the orientation direction but small strengths in a direction transversing the orientation direction. Thus, the molded articles show a high anisotropy. Further, the molded articles have no beautiful appearance due to the nonuniform flow marks. Accordingly, when said wholly aromatic polyester resins are molded into relatively large shapes such as ovenware, the molded articles tend to cause warpage and give no comfortable appearance.

In order to solve the above-mentioned problems of wholly aromatic polyester resins, it has hitherto been studied to incorporate fibrous reinforcing agents and fillers into the resins. When a fibrous reinforcing agent such as glass fiber is incorporated, improvement in rigidity and reduction in mold shrinkage are seen depending upon the amount of the agent added; however, improvement in anisotropy is low and no improvement in appearance is obtained. JP-A-1-165667 discloses a composition obtained by incorporating a glass fiber and titanium oxide into a wholly aromatic polyester resin. In this composition, slight improvement in appearance is seen according to the addition of titanium oxide but improvement in anisotropy is insufficient.

JP-A-60-124649 discloses a composition obtained by incorporating talc and titanium oxide into a wholly aromatic polyester resin. Although this composition has a significantly improved appearance and anisotropy without sacrificing the flowability of the wholly aromatic polyester resin, it has greatly reduced mechanical strengths, particularly greatly reduced impact strength. Therefore, the composition has an insufficient strength when molded into an ovenware.

JP-A-61-316 discloses an ovenware obtained by molding a composition comprising a wholly aromatic polyester resin, wollastonite and titanium oxide. Although this composition has high mechanical strengths, low anisotropy and excellent appearance, it shows a very high dissolution amount of solubles in an aqueous acetic acid (larger than 500 ppm). The dissolution amount is the amount of an evaporation residue when the ovenware is subjected to an extraction test according to No. 20 of the Welfare Ministry. In this test, the ovenware is immersed in a 4% aqueous acetic acid solution at 121° C. for 120 minutes and the evaporation residue of the resulting solution is measured. Accordingly, the composition is not desirable for use as cooking vessels, for example, an ovenware. The above very high dissolution amount is caused by the dissolution of wollastonite present in the composition, in 4% acetic acid.

It is an object of the present invention to provide a wholly aromatic polyester resin composition having a high heat resistance and good mechanical strengths, low anisotorpy and excellent appearance and being safe, that is, low in dissolution amount of harmful substances, as well as an ovenware obtained by molding said composition.

The present inventors made study in order to solve the above-mentioned problems of the prior art and, as a result, found that a composition meeting the above requirements can be obtained by incorporating into a wholly aromatic polyester resin specific amounts of (a) at least one fibrous reinforcing agent selected from the group consisting of a glass fiber and a silica-alumina fiber, (b) glass beads and (c) titanium oxide, and that a molded article obtained from the composition has excellent properties suitable for use as an ovenware. The above finding has led to the completion of the present invention.

According to the present invention, there are provided a wholly aromatic polyester resin composition having a high heat resistance and good mechanical strengths, low anisotropy and excellent appearance and showing low dissolution amount in an extraction test according to No. 20 of the Welfare Ministry, which comprises:

(1) 40–80% by weight of a wholly aromatic polyester resin having (A) at least one repeating unit selected from the group consisting of:

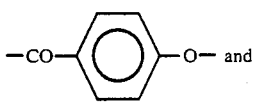

and

(B) at least one repeating unit selected from the group consisting of:

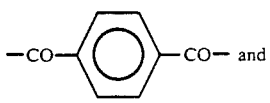

and

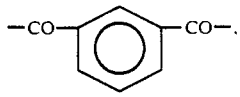

and (C) at least one repeating unit selected from the group consisting of:

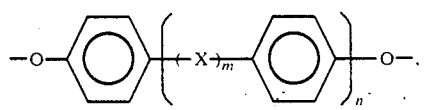

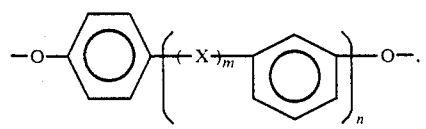

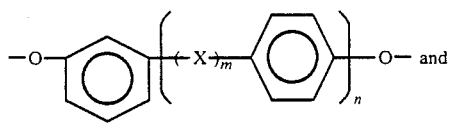

and

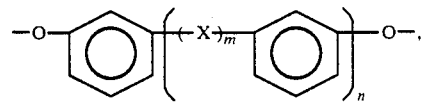

wherein X is —O—, —$SO_2$—, —S— or —CO—, and m and n are independently 0 or 1, wherein the numerical ratio of the repeating unit (A) to the repeating unit (B) ranges from 1:1 to 10:1, and the numerical ratio of the repeating unit (B) to the repeating unit (C) ranges from 9:10 to 10:9, (2) 5–25% by weight of at least one fibrous reinforcing agent selected from the group consisting of a glass fiber and a silica-alumina fiber, (3) 10–40% by weight of glass beads, and (4) 5–25% by weight of titanium oxide, the total content of the components (2) to (4) in the composition falling within the range of 20–60% by weight; as well as an ovenware obtained by molding the above wholly aromatic polyester resin composition.

Specific examples of the comonomers of the wholly aromatic polyester used in the present invention are parahydroxybenzoic acid, metahydroxybenzoic acid, terephthalic acid, isophthalic acid, hydroquinone, resorcin, 4,4'-dihydroxydiphenyl, 4,4'-dihydroxydiphenyl ether, 4,4'-dihydroxydiphenylsulfone, 4,4'-dihydroxydiphenyl sulfide, 4,4'-dihydroxybenzophenone and their derivatives.

Of these, there are preferred combinations of parahydroxybenzoic acid or its ester, terephthalic acid, isophthalic acid or its ester, and 4,4'-dihydroxydiphenyl or its ester. In obtaining a wholly aromatic polyester from these comonomers, it is possible to employ processes disclosed in JP-A-56-104932, JP-A-57-44622, etc.; however, other processes can be used as well.

The glass fiber used in the present invention is a glass fiber generally used as a reinforcing agent for resins. There can be used a short fiber of 50–250 μm in fiber length (so-called milled glass fiber) or a long fiber of 2–5 mm in fiber length (so-called chopped glass fiber); however, a milled glass fiber is preferable in view of the appearance of molded article. A milled glass fiber having a fiber diameter of 10 μm or less is particularly preferable. Examples of the commercially available milled glass fiber include EFH 75-01 and EFDE-50-01 (these are products of Central Glass Fiber Co., Ltd.) and REV-8 (a product of Nippon Glass Fiber Co., Ltd).

The silica-alumina fiber used in the present invention contains silica and alumina as main components. Those of various compositions are commercially available under a popular name of ceramic fiber. They even include an alumina-based fiber using alumina as a main component and a silica-based fiber using silica as a main component.

Specific example of the silica-alumina fiber is a fiber obtained by electrically melting substantially equal amounts of high-purity silica and alumina and blowing off the fine streams of the melt with high pressure air to convert the streams to a fiber. This fiber has an average fiber length of 50–200 μm and, as compared with a glass fiber, has a small average fiber diameter of 1.8–3.0 μm, and has a high maximum use temperature of 1,260° C. Examples of the commercial products of such a fiber are Ibiwool® CP-U and Ibiwool® CP-$U_{11}$ (these are products of IBIDEN CO., LTD.) and Kaowool® (a product of Isolite Insulating Products Co., Ltd.). An example of the commercial product of the alumina-based fiber is Saffil® (a product of ICI Japan, Limited).

The glass beads used in the present invention are those generally used as a filler for resins. Glass beads made of E-glass, having a diameter of 50 μm or less are preferable. An example of the commercial product is EGB 731 (a product of Toshiba Ballotini Co., Ltd.).

The fibrous reinforcing agent and glass beads can be used each in an untreated state. However, in order for them to have improved affinity with the resin, they may be used after being surface-treated with, for example, an aminosilane or epoxysilane coupling agent in such an extent that the object and effect of the present invention are not impaired.

The titanium oxide used in the present invention refers to $TiO_2$ widely used as a white pigment having a high hiding power. $TiO_2$ has two crystal structures, i.e. anatase type and rutile type. The anatase type is metastable and, at high temperatures, is converted to the rutile type which is stable. Moreover, the rutile type has a higher refractive index and a higher (by about 35%) hiding power than the anatase type. Therefore, the rutile type is preferable also in the present invention. $TiO_2$ of rutile type having particle diameters of 0.10–0.40 μm is used generally. $TiO_2$ surface-treated with a hydrated oxide of Al, Si or the like or with an organic substance having a good compatibility with the resin, can also be used as long as it does not adversely affect the thermal stability of the resulting composition. Examples of the commercial products of $TiO_2$ are Tipaque ® CR-50, CR-60 and A-100 (these are products of ISHIHARA SANGYO KAISHA, LTD.) and KR 310 (a product of Titan Kogyo K.K.).

The preferably effective wholly aromatic resin compositions are those which comprise: 40–80% by weight of the wholly aromatic polyester, 5–25% by weight of at least one fibrous reinforcing agent selected from the glass fiber and the silica-alumina fiber, 10–40% by weight of the glass beads and 5–25% by weight of the titanium oxide, wherein the total amount of the fibrous reinforcing agent, the glass beads and the titanium oxide is 20–60% by weight based on the resin composition.

When the total amount of the fibrous reinforcing agent, the glass beads and the titanium oxide is more than 60% by weight based on the resin composition and the amount of the wholly aromatic polyester is less than 40% by weight, the resulting composition has a poor melt flowability; therefore, its molding is difficult or, even if the molding is possible, the molded article is brittle and finds no practical use as an ovenware. Meanwhile, when the total amount of the fibrous reinforcing agent, the glass beads and the titanium oxide is less than 20% by weight, the resulting composition has no sufficient improvement in anisotropy and, when molded into an ovenware, gives warpage.

Even when the total amount of the fibrous reinforcing agent, the glass beads and the titanium oxide is 20–60% by weight based on the resin composition, if the amount of the fibrous reinforcing agent is less than 5% by weight, the resulting composition has insufficient mechanical strengths; if the amount of the fibrous reinforcing agent is more than 25% by weight, the molded article obtained from the resulting composition has poor appearance. Meanwhile, if the amount of the glass beads is less than 10% by weight, improvement in anisotropy is insufficient; if the amount of the glass beads is more than 40% by weight, reduction in mechanical strengths is large. Further, if the amount of the titanium oxide is less than 5% by weight, improvement in appearance is insufficient; if the amount is more than 25% by weight, the resulting composition has appearance similar to when the amount is 25% by weight or less, and has reduced mechanical strengths.

The composition of the present invention may further comprise at least one of ordinary additives such as antioxidant, heat stabilizer, ultraviolet absorber, coloring agents (e.g. dye, pigment), release improver (e.g. fluoroplastic) and the like, as long as the object of the present invention is not impaired. When there is added, in particular, a fluoroplastic of lubricant grade (e.g. polytetrafluoroethylene), releasing of molded article from mold is improved and, moreover, the molded article gives an ovenware of excellent non-tackiness.

The compounding means for obtaining the composition of the present invention has no particular restriction. In general practice, a wholly aromatic polyester, a fibrous reinforcing agent, glass beads and titanium oxide are mixed by a Henschell mixer, a tumbler or the like, and the mixture is melt kneaded by an extruder.

The present invention is hereinafter described in more detail by way of Examples. However, the present invention is in no way restricted to these Examples.

REFERENCE EXAMPLE 1

Production of wholly aromatic polyester A

Into a polymerization tank provided with comb-shaped agitating blades were fed 10.8 kg (60 moles) of p-acetoxybenzoic acid, 2.49 kg (15 moles) of terephthalic acid, 0.83 kg (5 moles) of isophthalic acid and 5.45 kg (20.2 moles) of 4,4'-diacetoxydiphenyl. The mixture was heated to 330° C. and polymerized at that temperature for 1 hour with stirring in a nitrogen gas atmosphere. The polymerization was effected with vigorous stirring while removing acetic acid generated as a by-product. Then, the system was slowly cooled and the reaction mixture was taken out of the system at 200° C. The yield of the reaction mixture was 13.25 kg (97.8% of theoretical yield). The reaction mixture was ground with a hammer mill made by Hosokawa Micron K.K. to prepare particles of 2.5 mm or less. The particles were treated in a rotary kiln in a nitrogen gas atmosphere at 280° C. for 3 hours to obtain a wholly aromatic polyester A in a particulate state, which comprises the following repeating units and having a flow temperature of 324° C. This polymer showed optical anisotropy at temperatures of 340° C. or more under pressure.

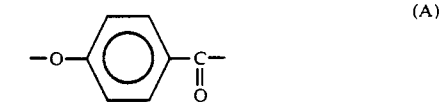
(A)

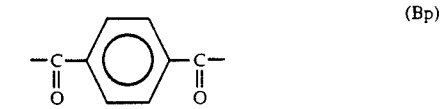
(Bp)

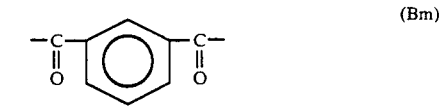
(Bm)

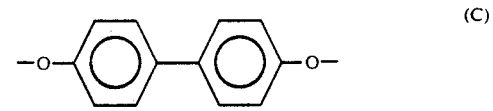
(C)

The numerical ratio of the repeating units (A), (Bp), (Bm) and (C) was 60:15:5:20.

REFERENCE EXAMPLE 2

Production of wholly aromatic polyester B 7.2 kg (40 moles) of p-acetoxybenzoic acid, 3.154 kg (19 moles) of terephthalic acid, 0.166 kg (1 mole) of isophthalic acid and 5.45 kg (20.2 moles) of 4,4'-diacetoxydiphenyl were polymerized under the same conditions as in Reference Example 1, to obtain a reaction mixture. The reaction mixture was ground in the same manner as in Reference Example 1 and then heat-treated in a rotary kiln in a nitrogen gas atmosphere at 280° C. for 3 hours, followed by heat treatment at 325° C. for 3 hours, to obtain a wholly aromatic polyester B in a particulate state, which comprises the following repeating units and having a flow temperature of 375° C. This polymer showed optical anisotropy at temperatures of 385° C. or more under pressure.

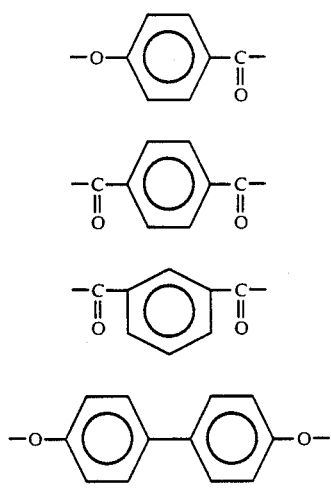

The numerical ratio of the repeating units (A), (Bp), (Bm) and (C) was 40:19:1:20.

In the above Reference Examples, flow temperature and optical anisotropy were measured in accordance with the following methods.

(1) Flow temperature

This was measured by a Koka type flow tester (CFT-500 manufactured by Shimadzu Corp). It is a temperature at which a resin melted by heating at a temperature elevation rate of 4° C./min shows a melt viscosity of 48,000 poises when extruded through a nozzle of 1 mm in inside diameter and 10 mm in length under a load of 100 kg/cm$^2$. A resin of lower flow temperature has higher flowability.

(2) Optical anisotropy

The optical anisotropy of a resin in a molten state was measured by heating a powdery resin placed on a heating stage, at a rate of 10° C./min under a polarized light and making visual observation. When there occurred no complete melting when the resin was allowed to stand, a spring pressure was applied.

EXAMPLES 1-6 AND COMPARATIVE EXAMPLES 1-4

The wholly aromatic polyester A, a glass fiber (EFDE 50-01 manufactured by Central Glass Fiber Co., Ltd.) of 6 μm in average diameter and 50 μm in average length, glass beads (EGB 731 manufactured by Toshiba Ballotini Co., Ltd.) of 17 μm in average diameter and titanium oxide (CR-60 manufactured by ISHIHARA SANGYO KAISHA, LTD.) were mixed according to a composition shown in Table 1. The mixture was melt kneaded at a temperature of 340° C. using a twin-screw extruder (PCM-30 manufactured by Ikegai Iron Works, Ltd.) to obtain pellets. The pellets were subjected to molding at a cylinder temperature of 350° C. and a mold temperature of 130° C. using an injection molding machine (PS40E 5ASE manufactured by Nissei Jushi Kogyo K.K.), to obtain a test piece [64 mm square and 3 mm thickness] for measurement of mold shrinkage, an ASTM No. 4 dumbbell for tensile test, and a test piece [127 mm (length) × 12.7 mm (width) × 6.4 mm (thickness)] for measurement of heat distortion temperature (HDT). Mold shrinkage was obtained by measuring MD and TD; tensile strength and HDT were measured in accordance with ASTM D 638 and ASTM D 648, respectively. Izod impact strength (unnotched) was measured in accordance with ASTM D 256, by dividing the test piece for HDT measurement into two equal portions in the lengthwise direction. The results are shown in Table 1.

All the compositions of the present invention had improved anisotropy in mold shrinkage, were balanced in tensile strength and Izod impact strength, gave a HDT higher than 260° C. (this temperature promises usability as an ovenware), and had good appearance when molded.

Meanwhile, the wholly aromatic polyester A alone (Comparative Example 1) had a high tensile strength and a high Izod impact strength due to the significant orientation, but had very high anisotropy and very poor appearance when molded. The composition comprising the wholly aromatic polyester A, the glass beads and the titanium oxide but comprising no fibrous reinforcing agent (Comparative Example 2) showed large improvement in anisotropy and excellent appearance when molded, but was low in tensile strength and Izod impact strength. The composition comprising the wholly aromatic polyester A, the glass fiber and the titanium oxide but comprising no glass beads (Comparative Example 3) showed improvements in anisotropy and appearance when molded, as compared with Comparative Example 1 but the improvements were not sufficient. The composition comprising the wholly aromatic polyester A, the glass fiber and the glass beads but comprising no titanium oxide (Comparative Example 4) showed sufficient improvement in anisotropy but gave poor appearance when molded.

EXAMPLES 7-9

Compositions shown in Table 2 were obtained in the same manner as in Examples 1-6, except that the glass fiber used in Examples 1-6 was replaced by a silica-alumina fiber of 100 μm in average length (Ibiwool ® CP-U$_3$ manufactured by IBIDEN CO., LTD.). The compositions were measured for the same test items as in Examples 1-6. As is clear from Table 2, the compositions had properties similar to those of Examples 1-6.

COMPARATIVE EXAMPLES 5-6

In the same manner as in Examples 1-6 were obtained a composition comprising the wholly aromatic polyester A, talc (Micron White ® #5000A manufactured by Hayashi Kasei K.K.) and titanium oxide (CR-60 manufactured by ISHIHARA SANGYO KAISHA, LTD.) (Comparative Example 5) and a composition comprising the wholly aromatic polyester A, wollastonite (NYAD ® G commercially available from Nagase & Company, Ltd.) and titanium oxide (CR-60 manufactured by ISHIHARA SANGYO KAISHA, LTD.) (Comparative Example 6). These compositions were measured for the same test items as in Examples 1-6. The results are shown in Table 3.

The composition of Comparative Example 5 had sufficient improvement in anisotropy and excellent appearance when molded, but was low in tensile strength and Izod impact strength. Meanwhile, the composition of Comparative Example 6 had properties similar to those of the composition of the present invention, as is clear from Table 3.

EXAMPLE 10

The four compositions shown below were each molded into a vessel of 148 mm × 104 mm × 32 mm (depth) (thickness: 1.6-2.0 mm) at a cylinder temperature of 340° C. and a mold temperature of 180° C. using an injection molding machine (515/150 MS manufactured by Mitsubishi Heavy Industries, Ltd.). All of the vessels had a good appearance but no warpage.

Composition of Example 2 composed of 50% by weight of the wholly aromatic polyester A, 15% by weight of the glass fiber, 25% by weight of the glass beads and 10% by weight of the titanium oxide.

Composition of Example 8 composed of 50% by weight of the wholly aromatic polyester A, 15% by weight of the silica-alumina fiber, 25% by weight of the glass beads and 10% by weight of the titanium oxide.

Composition of Comparative Example 5 composed of 50% by weight of the wholly aromatic polyester A, 40% by weight of the talc and 10% by weight of the titanium oxide.

Composition of Comparative Example 6 composed of 50% by weight of the wholly aromatic polyester A, 40% by weight of the wollastonite and 10% by weight of the titanium oxide.

With these vessels or test pieces for measurement of mold shrinkage, dropping impact resistance, resistance to the use in microwave oven with electric range and a property not to contaminate food were evaluated. Further, they were subjected to an extraction test according to No. 20 of the Welfare Ministry. The evaluations were carried out in accordance with the following methods.

The results are shown in Table 4.

(1) Dropping impact resistance

An empty vessel was dropped on a plastic tile from a height of 1.5 m and there was examined the times of dropping until the vessel showed first cracking. When there occurred no cracking after 20 times of dropping, it was expressed as >20.

(2) Resistance to the use in microwave oven with electric range

An empty vessel was placed on the turn table of a microwave oven with electric range (NE-8300 manufactured by Matsushita Electric Industrial Co., Ltd.) and irradiated with a microwave for 10 minutes. Then, the vessel was heated to 250° C. by the 600 W electric range of the oven and kept at that temperature for 10 minutes. The vessel was then taken out and examined for dimension and appearance.

(3) Property not to contaminate food 50 cc of a soy sauce was placed in a vessel; the vessel was placed on the turn table of a microwave oven with electric range (NE-8300 manufactured by Matsushita Electric Industrial Co., Ltd.) and irradiated with a microwave for 15 minutes; then, the vessel was washed. This cycle was repeated five times, after which the appearance of the resulting vessel was examined.

(4) Extraction test according to No. 20 of the Welfare Ministry

A test piece for measurement of mold shrinkage was immersed in a 4% aqueous acetic acid solution at 121° C. for 120 minutes; the resulting solution was subjected to evaporation; the amount of evaporation residue was weighed and expressed as dissolution amount.

As is clear from Table 4, all of the four compositions showed neither abnormality in resistance when used in microwave oven with electric range nor contamination of food. However, the composition of Comparative Example 5 caused cracking after 6 times of dropping, in dropping impact resistance; and the composition of Comparative Example 6 gave a very large dissolution amount (more than 500 ppm) in the extraction test according to No. 20 of the Welfare Ministry.

It is clear from the above that the composition of the present invention has an excellent resistance when used as an ovenware.

EXAMPLES 11-12 AND COMPARATIVE EXAMPLE 7

Two compositions corresponding to those of Example 2 and Example 8 were prepared by using the wholly aromatic polyester B in place of the wholly aromatic polyester A, and their properties were compared with the properties of the wholly aromatic polyester B alone (Comparative Example 7). Incidentally, the measurements of the properties were effected in the same manner as in Examples 2 and 8 except that the melt kneading by twin-screw extruder was effected at 370° C. and the cylinder temperature of injection molding machine was set at 400° C.

The results are shown in Table 5.

As is clear from Table 5, the wholly aromatic polyester B alone gave a minus value in mold shrinkage, showing a peculiar behavior (very high anisotropy) and also had poor appearance when molded. Meanwhile, the compositions of the present invention showed a large improvement in mold shrinkage and had an excellent appearance when molded.

The compositions of Examples 11 and 12 were molded into vessels in the same manner as in Example 10; the vessels had no warpage and good appearance, and showed results similar to those of Examples 2 and 8 in dropping impact resistance, resistance to the use in microwave oven with electric range, property not to contaminate food and extraction test according to No. 20 of the Welfare Ministry.

The composition of the present invention has high heat resistance and mechanical strengths, low anisotropy and excellent appearance and shows a low dissolution amount in an extraction test according to No. 20 of the Welfare Ministry; and the vessel obtained by molding the composition has properties suitable for use as an ovenware.

TABLE 1

| | Amounts in composition (wt. %) | | | | Mold shrinkage (%) | | Tensile strength (kg/cm$^2$) | Izod impact strength (kg · cm/cm) | HDT (°C.) | Appearance of molded article[1] |
|---|---|---|---|---|---|---|---|---|---|---|
| | Wholly aromatic polyester A | Fibrous reinforcing agent | Glass beads | Titanium oxide | MD | TD | | | | |
| Example 1 | 50 | Glass fiber 10 | 30 | 10 | 0.27 | 0.81 | 910 | 15 | 268 | ◯ |
| Example 2 | 50 | Glass fiber 15 | 25 | 10 | 0.26 | 0.92 | 960 | 16 | 270 | ◯ |
| Example 3 | 50 | Glass fiber 20 | 20 | 10 | 0.23 | 0.98 | 990 | 16 | 269 | ◯ |
| Example 4 | 50 | Glass fiber 15 | 15 | 20 | 0.25 | 1.06 | 930 | 14 | 266 | ◯ |
| Example 5 | 60 | Glass fiber 10 | 20 | 10 | 0.22 | 1.17 | 1040 | 17 | 265 | ◯ |

TABLE 1-continued

| | Amounts in composition (wt. %) | | | | Mold shrinkage (%) | | Tensile strength (kg/cm²) | Izod impact strength (kg · cm/cm) | HDT (°C.) | Appearance of molded article[1] |
|---|---|---|---|---|---|---|---|---|---|---|
| | Wholly aromatic polyester A | Fibrous reinforcing agent | Glass beads | Titanium oxide | MD | TD | | | | |
| Example 6 | 70 | Glass fiber 10 | 15 | 5 | 0.20 | 1.23 | 1180 | 20 | 264 | ○ |
| Comparative Example 1 | 100 | — | — | — | 0.13 | 1.45 | 1600 | 65 | 263 | X |
| Comparative Example 2 | 60 | — | 30 | 10 | 0.37 | 0.85 | 730 | 8 | 261 | ○ |
| Comparative Example 3 | 60 | Glass fiber 30 | — | 10 | 0.11 | 1.33 | 1280 | 28 | 270 | Δ |
| Comparative Example 4 | 60 | Glass fiber 15 | 25 | — | 0.21 | 1.13 | 1060 | 20 | 268 | X |

[1]○: Good. Δ: Partial appearance of nonuniform flow marks. X: Appearance of nonuniform flow marks

TABLE 2

| | Amounts in composition (wt. %) | | | | Mold shrinkage (%) | | Tensile strength (kg/cm²) | Izod impact strength (kg · cm/cm) | HDT (°C.) | Appearance of molded article[1] |
|---|---|---|---|---|---|---|---|---|---|---|
| | Wholly aromatic polyester A | Fibrous reinforcing agent | Glass beads | Titanium oxide | MD | TD | | | | |
| Example 7 | 50 | Silica-alumina fiber 5 | 35 | 10 | 0.30 | 0.78 | 850 | 13 | 262 | ○ |
| Example 8 | 50 | Silica-alumina fiber 15 | 25 | 10 | 0.25 | 0.96 | 950 | 14 | 266 | ○ |
| Example 9 | 60 | Silica-alumina fiber 10 | 20 | 10 | 0.21 | 1.20 | 1010 | 16 | 265 | ○ |

[1]○: Good

TABLE 3

| | Amounts in composition (wt. %) | | | Mold shrinkage (%) | | Tensile strength (kg/cm²) | Izod impact strength (kg · cm/cm) | HDT (°C.) | Appearance of molded article[1] |
|---|---|---|---|---|---|---|---|---|---|
| | Wholly aromatic polyester A | Main filler | Titanium oxide | MD | TD | | | | |
| Comparative Example 5 | 50 | Talc 40 | 10 | 0.18 | 0.70 | 710 | 7 | 261 | ○ |
| Comparative Example 6 | 50 | Wollastonite 40 | 10 | 0.20 | 0.87 | 930 | 15 | 269 | ○ |

[1]○: Good

TABLE 4

| Kind of composition | Dropping impact resistance | Resistance to the use in microwave oven with electric range | Contamination to food | Dissolution amount (ppm) according to No. 20 of the Welfare Ministry |
|---|---|---|---|---|
| Composition of Example 2 | >20 | No abnormality found | No abnormality found | 22.5 |
| Composition of Example 8 | >20 | No abnormality found | No abnormality found | 21.5 |
| Composition of Comparative Example 5 | 6 | No abnormality found | No abnormality found | 23.0 |
| Composition of Comparative Example 6 | >20 | No abnormality found | No abnormality found | 574 |

TABLE 5

| | Amount in composition (wt. %) | | | | Mold shrinkage (%) | | Tensile strength (kg/cm²) | Izod impact strength (kg · cm/cm) | HDT (°C.) | Appearance of molded article[1] |
|---|---|---|---|---|---|---|---|---|---|---|
| | Wholly aromatic polyester B | Fibrous reinforcing agent | Glass beads | Titanium oxide | MD | TD | | | | |
| Example 11 | 50 | Glass fiber 15 | 25 | 10 | 0.23 | 0.94 | 980 | 17 | 345 | ○ |
| Example 12 | 50 | Silica-alumina fiber 15 | 25 | 10 | 0.22 | 1.01 | 960 | 16 | 343 | ○ |
| Comparative Example 7 | 100 | — | — | — | −0.20 | 1.39 | 1610 | 63 | 350 | X |

[1]○: Good. X: Appearance of nonuniform flow marks

What is claimed is:

(1) 40-80% by weight of a wholly aromatic polyester resin having (A) at least one repeating unit selected from the group consisting of:

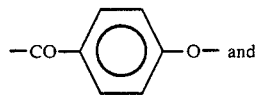
and

(B) at least one repeating unit selected from the group consisting of:

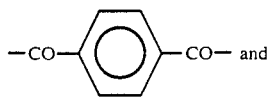
and

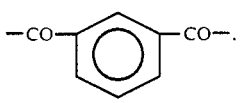

and (C) at least one repeating unit selected from the group consisting of:

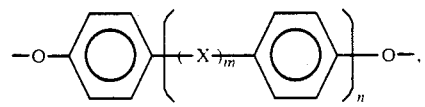

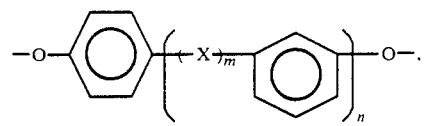

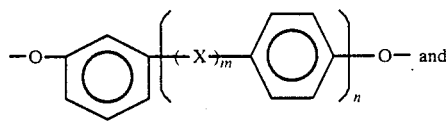
and

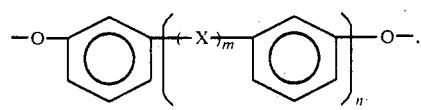

wherein X is —O—, —SO$^2$—, —S— or —CO—, and m and n are independently 0 or 1, wherein the numerical ratio of the repeating unit (A) to the repeating unit (B) ranges from 1:1 to 10:1, and the numerical ratio of the repeating unit (B) to the repeating unit (C) ranges from 9:10 to 10:9, and components consisting essentially of (2) at least one fibrous reinforcing agent selected from the group consisting of a glass fiber and a silica-aluminia fiber, (3) glass beads, and (4) titanium oxide, the amount of component (2) being 5-25% by weight, the amount of component (3) being 10-40% by weight, and the amount of component (4) being 5≧25% by weight, all percentages by weight being based on the total weight of the composition, the total content of the components (2) to (4) in the composition falling within the range of 20-60% by weight.

2. The wholly aromatic polyester resin composition of claim 1, wherein the repeating unit (A) is

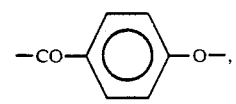

the repeating unit (B) is

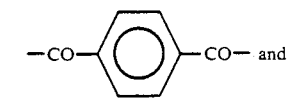
and

and the repeating unit (C) is

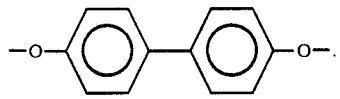

3. An ovenware obtained by molding the wholly aromatic polyester resin composition of claim 1.

* * * * *